(12) United States Patent
Baxter et al.

(10) Patent No.: US 9,766,011 B2
(45) Date of Patent: Sep. 19, 2017

(54) OPTIMIZED HEAT EXCHANGE IN A CO2 DE-SUBLIMATION PROCESS

(71) Applicant: L'Air Liquide, Societe Anonyme pour l'Etude et l'Exploitation des Procedes Georges Claude, Paris (FR)

(72) Inventors: Larry Baxter, Orem, UT (US); Paul Terrien, Baltimore, MD (US); Pascal Tessier, Wilmington, DE (US); Christopher Hoeger, Provo, UT (US)

(73) Assignee: NEWVISTAS CAPITAL, LLC, Provo, UT (US)

( * ) Notice: Subject to any disclaimer, the term of this patent is extended or adjusted under 35 U.S.C. 154(b) by 0 days.

(21) Appl. No.: 15/182,494

(22) Filed: Jun. 14, 2016

(65) Prior Publication Data

US 2016/0290714 A1    Oct. 6, 2016

Related U.S. Application Data

(63) Continuation-in-part of application No. 13/687,645, filed on Nov. 28, 2012, now abandoned.

(51) Int. Cl.
*F25J 3/06*     (2006.01)
*B01D 53/00*    (2006.01)

(52) U.S. Cl.
CPC ............ *F25J 3/067* (2013.01); *B01D 53/002* (2013.01); *B01D 2257/504* (2013.01); *B01D 2258/0283* (2013.01); *B01D 2259/65* (2013.01); *F25J 2205/20* (2013.01); *F25J 2210/70* (2013.01); *F25J 2220/82* (2013.01); *F25J 2240/02* (2013.01); *F25J 2270/12* (2013.01); *F25J 2270/90* (2013.01); *F25J 2280/40* (2013.01); *F25J 2290/12* (2013.01); *Y02C 10/12* (2013.01)

(58) Field of Classification Search
None
See application file for complete search history.

(56) References Cited

U.S. PATENT DOCUMENTS

2004/0011039 A1* 1/2004 Stinger ................. F01K 25/08
                                                    60/670
2008/0173585 A1* 7/2008 White .................. B01D 53/002
                                                    210/656
2008/0302133 A1* 12/2008 Saysset ............... B01D 53/002
                                                    62/617

(Continued)

FOREIGN PATENT DOCUMENTS

FR    WO 2010076466 A1 *  7/2010  ......... B01D 53/002

*Primary Examiner* — Etsub Berhanu
*Assistant Examiner* — Nelson Nieves

(57) ABSTRACT

The present invention is a process for removing carbon dioxide from a compressed gas stream including cooling the compressed gas in a first heat exchanger, introducing the cooled gas into a de-sublimating heat exchanger, thereby producing a first solid carbon dioxide stream and a first carbon dioxide poor gas stream, expanding the carbon dioxide poor gas stream, thereby producing a second solid carbon dioxide stream and a second carbon dioxide poor gas stream, combining the first solid carbon dioxide stream and the second solid carbon dioxide stream, thereby producing a combined solid carbon dioxide stream, and indirectly exchanging heat between the combined solid carbon dioxide stream and the compressed gas in the first heat exchanger.

6 Claims, 1 Drawing Sheet

(56) References Cited

U.S. PATENT DOCUMENTS

| | | | | |
|---|---|---|---|---|
| 2010/0107634 | A1* | 5/2010 | Xu | F17C 9/04 |
| | | | | 60/651 |
| 2011/0296868 | A1* | 12/2011 | Lockwood | B01D 53/002 |
| | | | | 62/617 |
| 2012/0006022 | A1* | 1/2012 | Woodland | F01K 25/06 |
| | | | | 60/641.2 |
| 2012/0137726 | A1* | 6/2012 | Currence | F25J 3/0209 |
| | | | | 62/613 |
| 2012/0297821 | A1* | 11/2012 | Baxter | B01D 53/343 |
| | | | | 62/617 |
| 2013/0025317 | A1* | 1/2013 | Terrien | B01D 53/002 |
| | | | | 62/602 |
| 2013/0081426 | A1* | 4/2013 | Lissianski | B01D 53/002 |
| | | | | 62/544 |

* cited by examiner

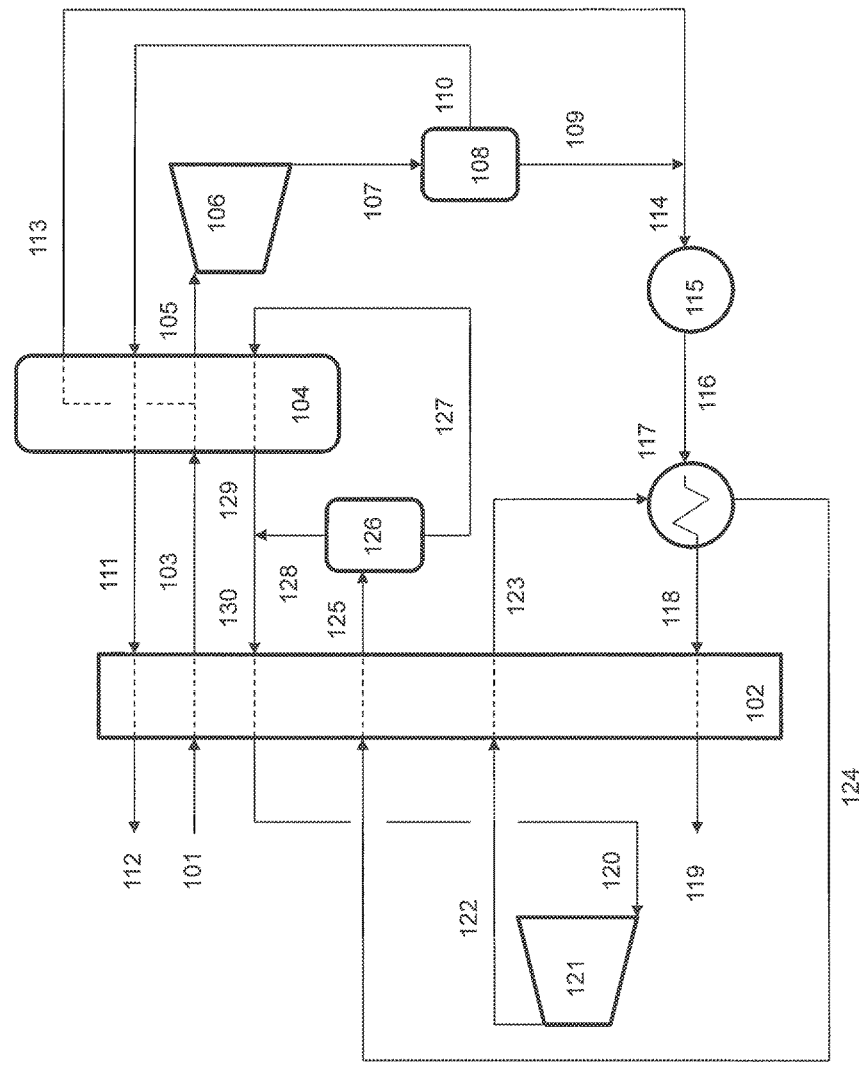

OPTIMIZED HEAT EXCHANGE IN A CO2 DE-SUBLIMATION PROCESS

CROSS REFERENCE TO RELATED APPLICATION

This application is a continuation-in-part of U.S. patent application Ser. No. 13/687,645, filed Nov. 28, 2012, which is incorporated by reference herein in its entirety.

GOVERNMENT LICENSE RIGHTS

This invention was made with government support under Award No. DE-AR0000101 awarded by U.S. Department of Energy (DOE). The government has certain rights in the invention.

BACKGROUND

Carbon dioxide emissions from fossil fuel combustion is a growing source of concern, and various technologies have been, and continue to be developed, for capturing CO2 from flue gas and other gas streams. Major technologies include amine wash, physical adsorption technologies, cryogenic technologies (CO2 liquefaction). These technologies involve significant additional investment and operating costs for industrial plants. In the case of coal power plants for example, a resulting increase of the cost of electricity in the range of 4 to 5 US cents/kWh is expected. One of the main challenges today is to reduce cost of carbon dioxide capture from flue gas through efficiency improvement and capital reduction.

There are major drawbacks to all the existing systems. One possible alternative to traditional capture solutions is called anti-sublimation. The basic concept is to separate CO2 from a flue gas by cooling the flue gas to turn the CO2 into solid (de-sublimation or cryo-condensation of CO2). Indeed, at such low CO2 partial pressure (<5.11 atmosphere), the CO2 will be directly changed from gas phase to solid phase. There are two main schemes to implement such a process. The first is de-sublimation at atmospheric or very low pressure. For this scheme, a significant external refrigeration loop is required to perform such a cooling. This is known as indirect de-sublimation. The second is de-sublimation at higher pressure by expansion with solid formation. This is known as direct de-sublimation.

However, in any case, the efficiency of the process is strongly related to the ability to integrate the heat exchange. This is to say that without heat exchangers to recover energy from the flue gas notably, the efficiency of the process would be drastically decreased. Hence, there is a need in the industry for an optimized heat exchange in a carbon dioxide de-sublimation process.

SUMMARY

The present invention is a process for removing carbon dioxide from a compressed gas stream including cooling the compressed gas in a first heat exchanger, introducing the cooled gas into a de-sublimating heat exchanger, thereby producing a first solid carbon dioxide stream and a first carbon dioxide poor gas stream, expanding the carbon dioxide poor gas stream, thereby producing a second solid carbon dioxide stream and a second carbon dioxide poor gas stream, combining the first solid carbon dioxide stream and the second solid carbon dioxide stream, thereby producing a combined solid carbon dioxide stream, and indirectly exchanging heat between the combined solid carbon dioxide stream and the compressed gas in the first heat exchanger.

A BRIEF DESCRIPTION OF THE DRAWINGS

FIG. 1 is a schematic representation of one embodiment of the present invention.

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

This invention relates to a specific process embodiment where the heat exchange is optimized in order to maximize efficiency in a realistic and cost-effective way.

The compressed flue gas stream 101 is first cooled down to above frosting point temperature in a multi-fluid heat exchanger 102 which may be a brazed aluminium heat exchanger (such as is a typical cryogenic heat exchanger used in Air Separation Units).

After multi-fluid heat exchanger 102, the refrigerated flue gas 103 is sent to a de-sublimating heat exchanger 104 where part of the CO2 is de-sublimated 113. After the de-sublimating heat exchanger 104, the partially CO2 depleted flue gas 105 is sent to an expansion turbine 106 where it is expanded to almost atmospheric pressure 107 and the remainder of the CO2 to be captured is recovered as solids 109 in solids separator 108, (i.e., achieving 90% capture of the incoming CO2 flow rate when streams 113 and 109 are combined).

The solid CO2 streams 113 and 109 are mixed together 114 and pumped to a high pressure 116 in solids pressurizer 115. This pressure should be high enough to not vaporize at ambient temperature. Then the high pressure CO2 stream 116 is sent to a melting heat exchanger 117 where most of the sensible heat plus the latent heat of fusion is recovered by the condensing refrigerant 123. The liquefied CO2 118 is then sent to the multi-fluid heat exchanger 102 to recover the sensible heat of the liquid, after which the warmed fluid 119 exits the system. The CO2-depleted cold gas 110 is sent to the de-sublimating heat exchanger 104 and to form stream 111 and then to the multi-fluid heat exchanger 102 to recover all the cold. Warmed CO2-depleted gas 112 is then pumped to the final pressure (not shown).

A small refrigeration loop is required in this configuration. The refrigerant cycle is an inversed rankine cycle. Those of ordinary skill in the art will recognize that an inversed rankine cycle includes the steps of compressing the refrigerant, condensing the refrigerant, expanding the refrigerant (to produce refrigeration), and vaporizing the refrigerant to recover the cold energy. As shown in the Figure, refrigerant 120 is compressed in compressor 121 to form compressed refrigerant 122. Compressed refrigerant 122 is then cooled in multi-fluid heat exchanger 102 to form cooled, compressed refrigerant 123. Cooled, compressed refrigerant 123 is then cooled in melting heat exchanger 117 to form liquid refrigerant 124. Liquid refrigerant is again cooled in multi-fluid heat exchanger 102 to form stream 125. Stream 125 is then sent to expansion device, wherein stream 125 is reduced in temperature, forming liquid 127 and gas 128. Liquid 127 is then vaporized in de-sublimating heat exchanger 104 to form vaporized refrigerant 129, which is combined with gas 128 to form combined refrigerant 130. Combined refrigerant 130 is then heated in multi-fluid heat exchanger and compressed again in compressor 121 as stream 120.

In embodiments of the invention, the condensation of the refrigerant happens in the melting heat exchanger 117, close to CO2 triple point temperature, and vaporization of the refrigerant happens in the de-sublimating heat exchanger 104, below the outlet temperature of the de-sublimating heat exchanger. However, all other heat recovery involved will happen in the multi-fluid heat exchanger 102.

The following points are important in order to achieve a high efficiency. There needs to be partial de-sublimation of the flue gas prior to the turbine, thus allowing less temperature difference between the inlet and the outlet of the turbine. This also allows the pressure required for the flue gas to be as low as approximately 6 bar absolute. There needs to be an inversed rankine cycle of the refrigerant with condensation happening at CO2 melting temperature There needs to be heat recovery of all fluids not involving solid CO2 in the multi-fluid heat exchanger (aluminium brazed in particular). The heat integration between flue gas lines, CO2 lines and refrigerant lines allows lowering the average temperature difference. Furthermore, a very low temperature approach (down to 2 C or below) would be achievable whereas typically 5 C is a reasonable limit in other types of heat exchanger.

What is claimed is:

1. A process for removing carbon dioxide from a compressed gas stream, the process comprising the steps of:
   cooling the compressed gas stream having carbon dioxide in a first heat exchanger to a first temperature that is above the frosting point of carbon dioxide to form a cooled compressed gas stream;
   cooling the cooled compressed gas stream in a second heat exchanger to a second temperature that is below the frosting point of carbon dioxide, wherein only a portion of the carbon dioxide within the cooled compressed gas stream de-sublimates thereby forming a first solid $CO_2$ stream and a $CO_2$ depleted gas stream;
   withdrawing the first solid $CO_2$ stream from the second heat exchanger;
   withdrawing the $CO_2$ depleted gas stream from the second heat exchanger;
   expanding the $CO_2$ depleted gas stream, such that the carbon dioxide within the $CO_2$ depleted gas stream de-sublimates to form a second $CO_2$ solid stream and a cold $CO_2$ depleted gas stream;
   combining the first solid $CO_2$ stream with the second solid $CO_2$ stream to form a final solid $CO_2$ stream;
   introducing the cold $CO_2$ depleted gas stream to the second heat exchanger and the first heat exchanger in succession in order to provide a first portion of refrigeration to the first and second heat exchangers;
   pressurizing the final solid $CO_2$ stream to a pressure that is at or exceeds the triple point of carbon dioxide to produce a pressurized solid $CO_2$ stream;
   melting the pressurized solid $CO_2$ stream in a melting heat exchanger to produce a liquid $CO_2$ stream;
   heating the liquid $CO_2$ stream in the first heat exchanger to form a warmed $CO_2$ fluid; and
   providing a second portion of refrigeration to the first and second heat exchangers using a reverse Rankine refrigeration cycle having a refrigerant, wherein the reverse Rankine refrigeration cycle comprises the steps of:
   (a) compressing the refrigerant in a compressor;
   (b) condensing the refrigerant;
   (c) expanding the refrigerant;
   (d) vaporizing the refrigerant;
   wherein step (b) occurs in the melting heat exchanger, at a temperature near the $CO_2$ triple point such that the refrigerant condenses,
   wherein step (c) further comprises sending the condensed refrigerant to an expansion device such that the condensed refrigerant is reduced in temperature and forms a mixed phase stream, separating the mixed phase stream into a gas refrigerant stream and a liquid refrigerant stream, sending the liquid refrigerant stream to the second heat exchanger for vaporization therein,
   wherein step (d) occurs in the second heat exchanger,
   wherein only a portion of the refrigerant provides refrigeration within the second heat exchanger.

2. A process for removing carbon dioxide from a compressed gas stream, the process comprising the steps of:
   cooling the compressed gas stream having carbon dioxide in a first heat exchanger to a first temperature that is above the frosting point of carbon dioxide to form a cooled compressed gas stream;
   cooling the cooled compressed gas stream in a second heat exchanger to a second temperature that is below the frosting point of carbon dioxide, wherein a portion of the carbon dioxide within the cooled compressed gas stream de-sublimates thereby forming a first solid $CO_2$ stream and a $CO_2$ depleted gas stream;
   withdrawing the first solid $CO_2$ stream from the second heat exchanger;
   withdrawing the $CO_2$ depleted gas stream from the second heat exchanger;
   expanding the $CO_2$ depleted gas stream, such that the carbon dioxide within the $CO_2$ depleted gas stream de-sublimates to form a second $CO_2$ solid stream and a cold $CO_2$ depleted gas stream;
   combining the first solid $CO_2$ stream with the second solid $CO_2$ stream to form a final solid $CO_2$ stream;
   introducing the cold $CO_2$ depleted gas stream to the second heat exchanger and the first heat exchanger in succession in order to provide a first portion of refrigeration to the first and second heat exchangers;
   pressurizing the final solid $CO_2$ stream to a pressure that is at or exceeds the triple point of carbon dioxide to produce a pressurized solid $CO_2$ stream;
   melting the pressurized solid $CO_2$ stream in a melting heat exchanger to produce a liquid $CO_2$ stream;
   heating the liquid $CO_2$ stream in the first heat exchanger to form a warmed $CO_2$ fluid; and
   providing a second portion of refrigeration to the first and second heat exchangers using a reverse Rankine refrigeration cycle having a refrigerant, wherein the reverse Rankine refrigeration cycle comprises the steps of:

(a) compressing the refrigerant in a compressor;
(b) condensing the refrigerant;
(c) expanding the refrigerant;
(d) vaporizing the refrigerant;
wherein step (b) occurs in the melting heat exchanger, wherein the refrigerant is condensed near −56.6° C.,
wherein step (d) occurs in the second heat exchanger,
wherein between steps (c) and (d), the refrigerant is split into a gas stream and a liquid stream, with the liquid stream being sent to the second heat exchanger for vaporization within the second heat exchanger, such that only a portion of the refrigerant provides refrigeration within the second heat exchanger.

3. The process as claimed in claim 1, wherein the gas refrigerant stream is combined with the refrigerant from step (d) downstream the second heat exchanger.

4. The process as claimed in claim 1, wherein the gas refrigerant stream is combined with the refrigerant from step (d) downstream the second heat exchanger and upstream the first heat exchanger, such that the gas refrigerant stream provides refrigeration to the first exchanger but not the second heat exchanger.

5. The process as claimed in claim 2, wherein the gas refrigerant stream is combined with the refrigerant from step (d) downstream the second heat exchanger.

6. The process as claimed in claim 2, wherein the gas refrigerant stream is combined with the refrigerant from step (d) downstream the second heat exchanger and upstream the first heat exchanger, such that the gas refrigerant stream provides refrigeration to the first exchanger but not the second heat exchanger.

* * * * *